United States Patent [19]

Toncelli

[11] Patent Number: 4,889,227
[45] Date of Patent: Dec. 26, 1989

[54] CONVEYOR BELT WITH PROJECTIONS INCLINED IN THE OPPOSITE DIRECTION

[76] Inventor: Dario Toncelli, Via Giovanni XXIII, 2, Bassano del Grappa (Vicenza), Italy

[21] Appl. No.: 76,018

[22] Filed: Jul. 21, 1987

[30] Foreign Application Priority Data

Jul. 29, 1986 [IT] Italy ............................... 85581 A/86

[51] Int. Cl.⁴ .............................................. B65G 15/42
[52] U.S. Cl. ............................. 198/699.1; 198/690.2
[58] Field of Search ................... 198/699.1, 688.1, 692, 198/699, 690.2

[56] References Cited

U.S. PATENT DOCUMENTS

| | | | |
|---|---|---|---|
| 1,817,037 | 8/1931 | Mattison | 198/699.1 X |
| 3,085,676 | 4/1963 | Hinchcliffe | 198/699 |
| 3,237,757 | 3/1966 | Perkins | 198/690.2 |
| 3,895,982 | 7/1975 | Persson | 198/699.1 X |

OTHER PUBLICATIONS

Sparks-Rough-Top Conveyor Belts, Apr. 1986.

Primary Examiner—Robert J. Spar
Assistant Examiner—Lyle Kimms
Attorney, Agent, or Firm—Bucknam and Archer

[57] ABSTRACT

Conveyor belt (1), comprises projections (2) and (3) of triangular shape, inclined in opposite direction. In this manner the article being conveyed (4) cannot slide even under the action of thrusts $F_1$ and $F_2$ directed in opposite directions, which may be applied on the article (4) by different machines during operation on the article (4) being conveyed by the conveyor (1).

4 Claims, 1 Drawing Sheet

CONVEYOR BELT WITH PROJECTIONS INCLINED IN THE OPPOSITE DIRECTION

The present invention relates to a conveyor belt intended to be used with articles which are subjected to a variety of operations along the conveyor belt.

A novel feature of the conveyor belt of the present invention resides in the fact that the active surface of the belt upon which the articles being transported rest is provided with projections which are inclined in opposite directions, and which are located in a variety of manners according to the particular requirements. In this manner the position of the articles being conveyed along the belt remains perfectly stable, even following eventual lateral thrusts which may be exerted on the article due to the operations being carried out. In this manner it is possible to foresee with a great degree of accuracy the moment in which each article is located in a position corresponding to particular stages of the operation, based only on the speed of the conveyor. The present invention thus eliminates the necessity of using suitable optical or mechanical devices which have been used to determine the position of the same articles on the conveyor.

It is well known that in the case of continuous operation, it is possible to avoid the use of optical or mechanical readers, or readers of any other type utilizing conveyor belts provided with small recesses which guarantee a sucking action between the conveyor and the article so as to prevent the motion of the article with respect to the surface of the conveyor. This device, however, is effective only with respect to objects of substantial weight or in the case in which the lateral forces are very small.

The object of the present invention is to provide a novel type of a conveyor belt, the surface of which being used to rest the articles is so shaped as to permit absolute stability of the articles being conveyed on the belt independently from the weight of the articles, and independently from the nature of the material of which the article is made.

A novel feature of the present invention is that the conveyor has projections on its surface, the projections having a triangular cross-section. The projections are alternately arranged in opposite direction, and they may be grouped in a variety of manners so as to guarantee a perfect stability of the article being conveyed, even when the article is subjected to tangential forces in one or in the other direction, which forces may be substantial.

Obviously the choice of the suitable material is very important in order to achieve the desired surface layer of the belt, and in particular, the mechanical properties of elasticity and deformability which must be determined accurately on the basis of the particular requirements of the operations on the articles being conveyed, as well as the shape of the articles which may provide a base of support.

The invention is further illustrated by reference to the accompanying drawings which show schematically some examples of the conveyor according to the present invention.

Figure 1:
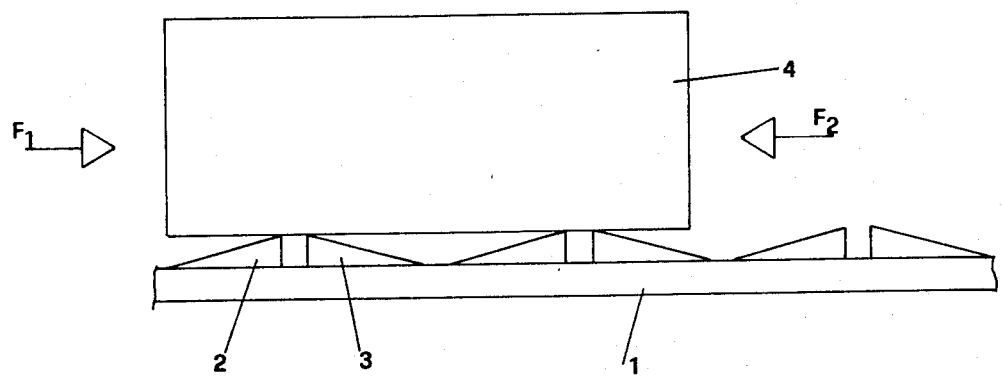
FIG. 1 is a side view in vertical cross-section of a conveyor with triangular projections alternated successively in the opposite direction.

As shown in FIG. 1, the conveyor belt is provided with projections 2 and 3 with right-angle triangular cross-section, oriented alternately in the opposite direction so that the object being conveyed 4 which rests on the vertices of the same projections deforms slightly the projections and creates a resting surface which prevents the article 4 from sliding with respect to the conveyor belt no matter whether the article is under the action of forces in the direction $F_1$ or forces in the opposite direction $F_2$.

Figure 2:
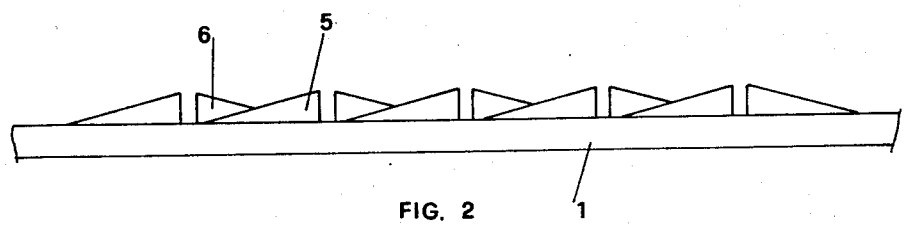
FIG. 2 illustrates another embodiment with projections side by side inclined alternately in the opposite direction.
Figure 3:
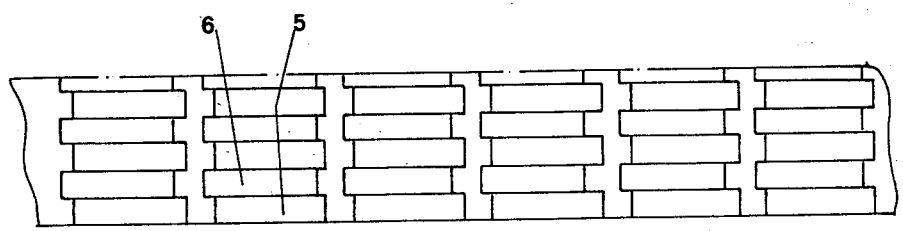
FIG. 3 is a top view of the embodiment of FIG. 2.
Figure 4:
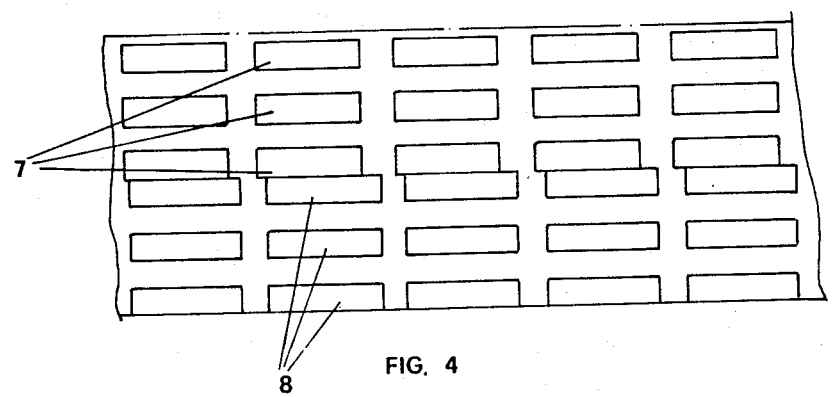
FIG. 4 is a top view of another possible arrangement of the projections of FIG. 3.

In FIGS. 2 and 3, the projections having a triangular cross-section 5 and 6 are arranged side by side and inclined in the opposite direction. In FIG. 4, the projections 7 and 8 are arranged in groups inclined in the opposite direction.

Obviously the embodiments illustrated and described hereinabove have been given merely by way of nonlimiting examples because the projections may assume various shapes and appearances depending upon the particular requirements and the type of use of the conveyor, and in order to guarantee in every case a perfect adherence of the articles being conveyed to the conveyor itself.

The conveyor belt of the present invention may be used for a variety of applications. For instance, it may be used in connection with honing machines, used continuously in the field of marble, granite and hard stone in which the slab which has a small thickness and therefore has reduced weight, during the polishing phase, is subjected to substantial alternate tangential forces due to the action of the smoothing mandrels which have alternating transversal motion with respect to the advance of the slab. In this type of machine, there is always the requirement of knowing perfectly the position of the slab in order to control the raising and lowering of the grinding wheel so that breakage of the grinding wheel may be avoided, which breakage is unavoidable if during the operation the slab has been dislocated. The control of the position of the slab is carried out by determining the path of the conveyor with a simple mechanical reader assuming that the slab being worked on is rigidly connected to the conveyor. By using the projections of the present invention, adherence of the article to the conveyor is guaranteed, and consequently, it is not necessary to use readers for the position of the slabs which may be located along the path, with substantial saving and lower maintenance costs, which maintenance costs may be costly due to the environment in which the readers are positions.

Obviously, also in other forms of operation for different articles it is possible to use the conveyor belts of the present invention with substantial advantages.

What is claimed is:

1. A conveyor belt for conveying articles of marble, stone and the like being subjected to various operations of grinding, polishing and for maintaining the articles stable during said operations, along the path of the conveyor, which comprises a plurality of inclined projections of right angle triangular cross section in the longitudinal direction and rectangular when viewed above the conveyor and located on the surface of the conveyor belt along the entire width thereof and forming rows along the entire length thereof, said projections of each row being alternately arranged in opposite directions along the longitudinal direction of the conveyor, and being made of a material of predetermined mechanical properties, depending upon the particular applications of use, said projections under the weight of said article being conveyed being capable of deforming slightly, therefore ensuring sufficient adherence of the article being conveyed and the immobility of said article with respect to said conveyor belt, even under the actions of longitudinal thrusts in one or the opposite direction.

2. A conveyor belt for conveying articles of marble, stone and the like being subjected to various operations of grinding, polishing and for maintaining the articles stable during said operations, along the path of the conveyor, which comprises a plurality of inclined projections of right angle triangular cross section in the longitudinal direction and rectangular when viewed above the conveyor and located on the surface of the conveyor belt along the entire width thereof and forming rows along the entire length thereof, said projections are arranged in parallel rows along the entire width of said conveyor, the projection of each row of said parallel rows being alternately inclined in opposite direction.

3. The conveyor according to claim 1 wherein said projections are inclined in the same direction along adjacent rows in the longitudinal direction of the conveyor.

4. A conveyor belt for conveying articles of marble, stone and the like being subjected to various operations of grinding, polishing and for maintaining the articles stable during said operations, along the path of the conveyor, which comprising a plurality of inclined projections of right angle triangular cross section in the longitudinal direction and rectangular when viewed above the conveyor and located on the surface of the conveyor belt along the entire width thereof and forming rows along the entire length thereof, wherein said projections are arranged in groups, said groups being inclined in opposite direction in a variety of combinations.

* * * * *